United States Patent
Nishino et al.

[11] 3,905,917
[45] Sept. 16, 1975

[54] CATALYST FOR PURIFYING EXHAUST GAS

[75] Inventors: Atsushi Nishino; Kazunori Sonetaka, both of Neyagawa; Hiroshi Kumano, Daito; Yoshinori Noguchi, Neyagawa, all of Japan

[73] Assignee: Matsushita Electric Industrial Co., Ltd., Kadoma, Japan

[22] Filed: July 20, 1973

[21] Appl. No.: 381,232

[30] Foreign Application Priority Data
June 15, 1973 Japan................ 48-68043
June 15, 1973 Japan................ 48-68049

[52] U.S. Cl............ 252/455 R; 252/463; 423/213
[51] Int. Cl.² .................... B01J 29/06; B01J 23/08
[58] Field of Search .................. 252/455 R, 463

[56] References Cited
UNITED STATES PATENTS

| | | |
|---|---|---|
| 3,161,683 | 12/1964 | Ciocchetti............ 252/455 R X |
| 3,221,002 | 11/1965 | Orzechowski et al....... 252/455 R X |
| 3,723,351 | 3/1973 | Flank et al................ 252/455 R X |
| 3,723,352 | 5/1973 | Alexander et al.......... 252/455 R X |
| 3,779,946 | 12/1973 | Dorn et al................. 252/455 R X |

*Primary Examiner*—Paul F. Shaver
*Attorney, Agent, or Firm*—Stevens, Davis, Miller & Mosher

[57] ABSTRACT

Catalyst for purifying exhaust gas comprises manganese oxide as a main catalytic component, calcium aluminate as a binder, and heat-resistant aggregate wherein the manganese oxide is bonded and solidified onto the aggregate by calcium aluminate($mAl_2O_3 \cdot nCaO$), and has an excellent ability to purify the exhaust gas from petroleum combustors or automobiles and a long catalytic life owing to its high heat resistance.

8 Claims, 4 Drawing Figures

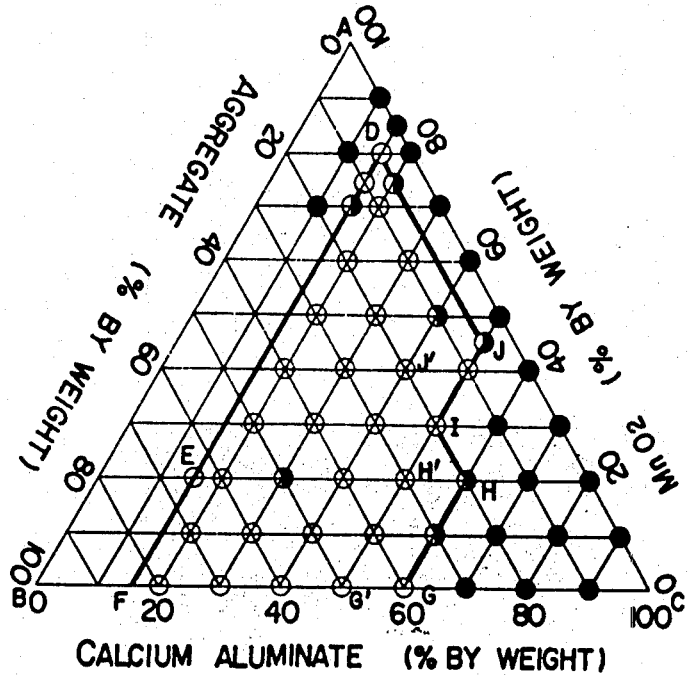

CATALYST FOR PURIFYING EXHAUST GAS

This invention relates to a catalyst for purifying an exhaust gas from automobiles or various combustors, particularly an exhaust gas containing carbon monoxide or hydrocarbon or both carbon monoxide and hydrocarbon, and provides a catalyst having a good spalling resistance at a high temperature.

The conventional catalysts for purifying exhaust gas have been prepared by impregnating carriers consisting mainly of alumina balls or glass fibers with a water-soluble metal salt as a catalytic component, and depositing the metal onto the carrier by thermal decomposition of the metal salt, and metals of group VIII of the Periodic Table such as platinum, palladium, iron, cobalt, nickel etc. as well as their oxides have been used as the catalytic components. However, these conventional catalysts have the following disadvantages.

The alumina ball or glass fiber carrier is expensive and not economical. Impregnation of the carrier with the catalytic component is very difficult, and the catalytic component is hard to distribute over the carrier uniformly. The catalyst has a low abrasion resistance due to vibration, and particularly a low spalling resistance at a high temperature. Consequently, the catalytic life is short.

Metallic oxide catalysts prepared through bondage with a binder such as alumina cement, etc. can be used at a low temperature such as 300° to 400°C, but their spalling resistance is decreased at a high temperature such as 500°C or higher. For example, such metallic oxide catalysts are used as a catalytic component for purifying exhaust gas from automobile, where the catalyst temperature reaches 800°C to 1,000°C, a spalling phenomenon appears on the catalyst, and consequently the catalytic life is shortened and the abrasion resistance is lowered.

An object of the present invention is to provide a cheap catalyst of uniform quality for purifying exhaust gas, which can withstand such a high temperature as 400°C to 600°C and can be utilized for purifying exhaust gas, for example, from petroleum combustors.

Another object of the present invention is to provide a catalyst for purifying exhaust gas, which can withstand such a high temperature as 800°C to 1,000°C and can be utilized for purifying exhaust gas, for example, from automobiles.

The catalyst of the present invention consists of manganese oxide as a main catalytic component, calcium aluminate as a heat-resistant binder, and a heat-resistant aggregate.

As the manganese oxide as the main catalytic component, manganese dioxide ($MnO_2$), manganite ($Mn_2O_3$), trimanganese tetraoxide ($Mn_3O_4$), etc. are used. As $MnO_2$, $\gamma$-$MnO_2$ obtained by electrolysis of an aqueous solution of manganese salt is used, but natural $MnO_2$ ores and chemically synthesized $MnO_2$ may be also used. However, in view of the quality, uniformity and catalytic activity of the main catalytic component, particularly $\gamma$-$MnO_2$ is preferable. When manganese oxides, $MnO_x$, (wherein $X = 1.3 - 2.0$) are used as a raw material for the main catalytic component, the advantage of using particularly $MnO_2$ among other manganese oxides are given below:

1. It is possible to increase a ratio of manganese oxide in the catalyst, because, when such lower oxides as $Mn_2O_3$ and $Mn_3O_4$ are used as the raw material for the main catalytic component, a catalyst of high bonding strength cannot be obtained unless a ratio of calcium aluminate ($mAl_2O_3 \cdot nCaO$) as a heat-resistant binder is increased. $MnO_2$ is an amphoteric oxide, but $Mn_2O_3$ and $Mn_3O_4$ are basic oxides. $Mn_2O_3$ and $Mn_3O_4$ can relatively increase an alkalinity and much accelerate a curing time, but give the catalyst a very high brittleness, contrary to the catalyst obtained from $MnO_2$.

2. $MnO_2$ is cheaper as the raw material than $Mn_2O_3$ and $Mn_3O_4$, because $MnO_2$ undergoes thermal modification as follows:

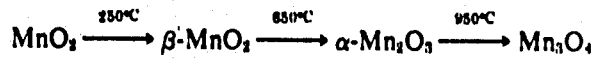

$$MnO_2 \xrightarrow{250°C} \beta\text{-}MnO_2 \xrightarrow{650°C} \alpha\text{-}Mn_2O_3 \xrightarrow{950°C} Mn_3O_4$$

That is to say, the electrowinning $\gamma$-$MnO_2$ or chemically synthesized $\beta$-$MnO_2$ or $\alpha$-$MnO_2$ is modified into $\beta$-$MnO_2$ at about 250°C at first. Then, the $\beta$-$MnO_2$ is modified into $\alpha$-$Mn_2O_3$ at a temperature of 450° to 650°C, and further modified into $Mn_3O_4$ at 950° to 1,050°C. On the other hand, $Mn_2O_3$ or $Mn_3O_4$ is the basic oxide, and chemically more unstable than $MnO_2$. Furthermore, the catalyst based on $MnO_2$ undergoes modification at a high temperature as mentioned above, and therefore it is not necessary to use $Mn_2O_3$ or $Mn_3O_4$ as the raw materials for the main catalytic component.

3. When a catalyst is prepared from $MnO_2$ as the raw material for the main catalytic component, and $MnO_2$ is modified to $Mn_2O_3$ or $Mn_3O_4$ when used, the catalytic activity of the catalyst is more stable and the catalytic life is longer.

As the calcium aluminate for the heat-resistant binder, the commercially available, ordinary alumina cement and alumina cement of high alumina content can be used. The calcium aluminate has a good heat resistance, as comared with the ordinary cement such as portland cement, etc., and further its low calcium oxide (CaO) content is more suitable for the manganese oxide, because, if the binder has a higher calcium oxide content, calcium oxide of the binder is liable to react with manganese oxides as the main catalytic component at a high temperature such as 700°C or higher to partially form $CaMn_2O_4$, etc., and a heat deterioration of the catalyst is brought about thereby and a high temperature activity of the catalyst is reduced. Preferable alumina ($Al_2O_3$) content of calcium aluminate is 50 to 80 percent by weight and calcium oxide (CaO) content thereof 40 to 15 percent by weight.

The heat-resistant aggregates give an important influence upon the spalling resistance, and particularly the aggregates having a large heat shrinkage at a high temperature should not be used.

The aggregates used in the present invention include silicate minerals consisting mainly of $SiO_2$ as a silica aggregate, such as siliceous sands; mullite consisting mainly of $mAl_2O_3 \cdot nSiO_2$ as an alumina-silica aggregate, such as chamotte ($3Al_2O_3 \cdot 2SiO_2$), sillimanite ($Al_2O_3 \cdot SiO_2$), and agalmatolite, corundum consisting mainly of $Al_2O_3$ as an alumina aggregate such as $\alpha$-$Al_2O_3$, $\beta$-$Al_2O_3$ and $\gamma$-$Al_2O_3$.

These aggregates can be used after having been crushed to some extent, or commercially available conical siliceous sand or commercially available aggregates of alumina or chamotte can be also used. Furthermore, it is usually advantageous to use the commercially available siliceous sand or chamotte. Further, aggregates of magnesia, chrome, dolomite, magnesia-chrome or chrome-magnesia system can be satisfactorily used, but these aggregates are usually used at a very high temperature, for example, 1,300°C or higher, and therefore not economical for obtaining a cheap catalyst. When a catalyst is used for purifying exhaust gas from automobiles, the only requirement for the catalyst is, in general, a good spalling resistance at a maximum temperature of 1,000°C, and therefore said silica aggregates can meet such requirement satisfactorily. The ordinary sands, beach sand, etc. are cheap, but the spalling phenomena appear in the aggregates themselves at a high temperature, and as a result the catalyst breakage takes place. Therefore, the ordinary sand, beach sand, etc. cannot be used at a high temperature such as 1,000°C.

When a catalyst is used for purifying the exhaust gas from petroleum combustors, etc., the only requirement for the catalyst is a good spalling resistance at a temperature of about 600°C, and therefore, the ordinary sand, beach sand, etc. which are cheapest among the available silica aggregates, can be conveniently utilized.

The distribution of particle sizes of the heat-resistant aggregates gives also an important influence upon the spalling resistance of the catalyst, and therefore an optimum particle size must be selected in view of the desired purpose, use and conditions.

The catalyst of the present invention can be advantageously prepared in the following manner.

A mixture of manganese dioxide, calcium aluminate and heat-resistant aggregates is admixed with a sufficient amount of water to mold the mixture, and then molded into the desirable shape. Only the surfaces of the molded articles are dried so that the articles may not stick to one another, and then the molded articles are subjected to the primary curing by leaving the articles standing until the articles have a mechanical strength to some extent. Since said amount of water is not sufficient for complete curing, the articles are then subjected to complete curing in water, warm water or steam.

To give the resulting catalyst a sufficient spalling resistance, it is necessary to make appropriate the mixing ratio of manganese oxide, calcium aluminate and heat-resistant aggregates, curing conditions, etc. Above all, the mixing ratio is especially important, and a ratio of the heat-resistant aggregate must be increased and a ratio of calcium aluminate must be decreased for a high temperature use.

Now, the present invention will be explained in detail by way of examples and drawings.

The accompanying drawings show relations between compositions of the catalyst and spalling resistance.

FIGS. 1 and 2 show the spalling resistances at 600°C and 700°C, respectively, of catalysts, where beach sands are used as the aggregate.

FIGS. 3 and 4 show the spalling resistances at 500°C and 900°C, respectively, of catalysts, where siliceous sands are used as the aggregate.

Table 1 shows relation between the composition of the catalyst and the spalling resistance at specific temperatures, and these relations are plotted in ternary catalyst composition diagrams of manganese dioxide, calcium aluminate, and heat resistant aggregate as shown in FIGS. 1 and 2. In FIG. 1, the catalysts are heated at a temperature of 600°C for 4 hours, and in FIG. 2 the catalysts are heated at a temperature of 700°C for 4 hours.

In Table 1 and FIGS. 1 and 2, the mark "○" indicates that no cracking appeared among 10 catalysts; the mark "◐" indicates that 1 to 4 catalysts were cracked among 10 catalysts; the "●" indicates that 5 or more catalysts were cracked among 10 catalysts.

The data at heating at 500°C for 4 hours are not shown in a ternary catalyst composition diagram, but the results were quite similar to those of the diagram at heating at 600°C for 4 hours.

The catalysts of Table 1 were prepared in the following manner. γ - $MnO_2$, calcium aluminate and beach sand as the heat-resistant aggregate were mixed in the mixing ratio as shown in Table 1, admixed with a sufficient amount of water to mold the mixture, molded into cylindrical shapes, 5mm in diameter and 10 mm long, under a pressure of 1 ton/$cm^2$, subjected to the primary curing for 1 to 2 hours, then to the secondary curing for 72 hours in steam, and dried.

Table 1

| Catalyst composition uz.1/32 (% by weight) | | | Spalling resistance | | |
|---|---|---|---|---|---|
| Calcium aluminate | $MnO_2$ | aggregates | Heating, 500°C, 4 hours | Heating, 600°C, 4 hours | Heating, 700°C, 4 hours |
| 10 | 90 | 0 | ● | ● | ● |
| 10 | 80 | 10 | ● | ● | ● |
| 10 | 70 | 20 | ● | ● | ● |
| 15 | 85 | 0 | ◐ | ● | ● |
| 15 | 80 | 5 | ○ | ○ | ◐ |
| 15 | 75 | 10 | ◐ | ○ | ● |
| 15 | 70 | 15 | ○ | ◐ | ◐ |
| 15 | 20 | 65 | ○ | ○ | ◐ |
| 50 | 10 | 40 | ○ | ○ | ● |
| 50 | 0 | 50 | ○ | ○ | ● |

These results reveal the difference in the spalling resistance at various temperatures. That is, in the case of heating at 600°C for 4 hours, the catalysts comprising the beach sand as the aggregate can be sufficiently used, but no specific tendency of the mixing ratio is seen at 700°C, and almost all of the catalysts are cracked. That is, the catalysts comprising beach sands as the aggregate can sufficiently play their roles within a specific composition range at 600°C.

The catalysts containing more than 60 percent by weight of calcium aluminate as a binder undergo cracking even at 500°C.

In view of the spalling resistance at 600°C, the composition of the catalyst must be within a range surrounded by lines plotted between the following points, D, F, G, H, I and J in the ternary catalyst composition diagram of FIG. 1.

| Points | Composition (% by weight) | | |
|---|---|---|---|
| | Aggregates (beach sand) | Calcium aluminate | $MnO_2$ |
| D | 5 | 15 | 80 |
| F | 85 | 15 | 0 |
| G | 40 | 60 | 0 |
| H | 20 | 60 | 20 |
| I | 20 | 50 | 30 |
| J | 5 | 50 | 45 |
| E | 65 | 15 | 20 |
| G' | 50 | 50 | 0 |
| H' | 30 | 50 | 20 |
| J' | 20 | 40 | 40 |

The relations between the activity of the catalysts and the content of manganese dioxide of the catalyst are given in Table 2. The percent purification of carbon monoxide listed in Table 2 was calculated from concentration of residual carbon monoxide, when the catalysts as shown in Table 1 were pulverized to particle sizes of 5 - 10 mesh, 70cc of the pulverized catalysts was packed in a gas passage consisting of a quartz glass tube, 30 mm in inner diameter, and a gas consisting of 1,500 ppm carbon monoxide, 15.0 percent oxygen and 84.85 percent nitrogen was passed through said catalyst layer at a flow rate of 7l/min., while keeping the temperature of the catalyst layer constant.

Table 2

| Catalyst composition (% by weight) | | | Percent purification of CO (%) | |
|---|---|---|---|---|
| Calcium aluminate | MnO₂ | Aggregates | 300°C | 600°C |
| 20 | 80 | 0 | 98.0 or higher | 98.0 or higher |
| 20 | 70 | 10 | 98.0 or higher | 98.0 or higher |
| 20 | 50 | 30 | 90.1 | 98.0 or higher |
| 20 | 20 | 60 | 74.3 | 86.2 |
| 20 | 0 | 80 | 16.9 | 34.8 |

The forgoing results reveal that the catalysts having a lower manganese dioxide content that 20 percent by weight have a very poor percent purification of carbon monoxide at such a low temperature as 300°C, whereas the catalyst having a manganese dioxide content of 20 percent by weight has a good percent purification of more than 70 percent. Further, at a temperature of 600°C, the percent purification is improved even with the manganese dioxide content of less than 20 percent by weight, but the percent purification lower than 50 percent is never satisfactory. The percent purification is more than 85 percent with the manganese dioxide content of 20 percent by weight or more, and is very satisfactory. Manganese dioxide content greatly contributes to the percent purification, and the percent purification is not changed almost at all even by changing the contents of calcium aluminate and aggregate, while keeping the manganese dioxide content constant.

It is seen from the foregoing that the catalysts that can satisfy the spalling resistance and the catalytic activity at an intermediate temperature up to about 600°C are within a composition range surrounded by the lines plotted between the points D, E, H, I and J of FIG. 1.

In the foregoing examples, the beach sands were used as the aggregate, but the similar results could be obtained with the ordinary sands.

As the binder, calcium aluminate having about 79.8 percent by weight of alumina and about 18.7 percent by weight of calcium oxide, the balance being $Fe_2O_3$ and $TiO_2$, was used in the foregoing examples, but the similar result could be obtained with calcium aluminate having a calcium oxide content of 40 percent by weight or less.

When calcium aluminate having a calcium oxide content of more than 40 percent by weight is used as the binder, calcium oxide of the binder is liable to react with manganese dioxide to form $CaMn_2O_4$, etc., if the catalyst is locally elevated to a high temperature, and thermal deterioration of the catalyst can be sometimes brought about, resulting in failure of long use. When calcium aluminate having a calcium oxide content of less than 15 percent by weight is used as the binder, the calcium aluminate fails to play a role of a binder for the manganese dioxide and the aggregate, and the mechanical strength of the catalyst is much lowered, resulting in failure of practical use. In view of the bonding strength and heat resistance, the preferable composition of calcium aluminate is 50 to 80 percent by weight of alumina and 40 to 15 percent by weight of calcium oxide.

Now, explanation will be made of the composition of the catalyst of the present invention, which can withstand a high temperature use. The catalysts used in the following examples were prepared by mixing γ-MnO₂ calcium aluminate and siliceous sands (Conical Siliceous Sand No. 7 available from Sanseki Taika Rengo K. K., Japan) as a heat-resistant aggregate in the mixing ratios as shown in Table 3, and carrying out the addition of water, molding, primary and secondary curing and drying in the same manner as in examples of Table 1.

Table 3 show relations between the composition of the catalyst and the spalling resistances at specific temperatures, and these relations are plotted in ternary catalyst composition diagrams of manganese dioxide, calcium aluminate and heat-resistant aggregate as shown in FIGS. 3 and 4. In FIG. 3, the catalysts are heated at a temperature of 500°C for 4 hours, and in FIG. 4, the catalysts are heated at a temperature of 900°C for hours. The data at heating at 700°C for 4 hours are not shown in a ternary catalyst composition diagram, but the results were quite similar to those of the diagram at heating at 900°C for 4 hours.

Table 3

| Catalyst composition (% by weight) | | | Spalling resistance | | |
|---|---|---|---|---|---|
| calcium aluminate | MnO₂ | Aggregates | Heating, 500°C, 4 hours | Heating, 700°C, 4 hours | Heating, 900°C, 4 hours |
| 10 | 90 | 0 | ● | ● | ● |
| 10 | 80 | 10 | ● | ● | ● |
| 10 | 70 | 20 | ● | ● | ● |
| 15 | 85 | 0 | ◐ | ● | ● |
| 15 | 80 | 5 | ○ | ○ | ◐ |
| 15 | 75 | 10 | ○ | ○ | ○ |
| 15 | 70 | 15 | ○ | ○ | ○ |
| 15 | 20 | 65 | ○ | ○ | ○ |
| 20 | 80 | 0 | ◐ | ● | ● |
| 20 | 75 | 5 | ○ | ◐ | ◐ |
| 20 | 70 | 10 | ○ | ○ | ○ |
| 90 | 10 | 0 | ● | ● | ● |
| 90 | 0 | 10 | ● | ● | ● |

In Table 3, the meanings of the marks are the same as in Table 1.

These results reveal, in comparision with the result shown in Table 1, that there are significant difference in the spalling resistance at high temperatures between the catalysts comprising siliceous sands as the aggregate and those comprising the beach sands as the aggregate. That is, there is no difference almost at all there between in the case of the heating at 500°C for 4 hours and the catalysts comprising the beach sand as the aggregates can be sufficiently used at that temperature but the influence of the aggregates is large at the heating at 700°C. The catalysts comprising beach sand the aggregates have no specific tendency with respect to the mixing ratio, and undergo cracking almost at a . On the other hand, the catalysts comprising the siliceous sands as the aggregate can play their role even the heating at 900°C within their specific composition range.

The catalysts having a content of calcium aluminate of more than 60 percent by weight as the binder undergo cracking even at 500°C.

It is seen from the foregoing that the catalysts having a good spalling resistance at high temperatures of 700°C or higher must be in a composition range surrounded by the lines plotted between the following points, D, F, G', I, J', K, L and M in the ternary catalyst composition diagram of FIG. 4.

| Points | Composition (% by weight) | | |
|---|---|---|---|
| | Aggregates (conical siliceous sands) | Calcium aluminate | $MnO_2$ |
| D | 5 | 15 | 80 |
| F | 85 | 15 | 0 |
| G' | 50 | 50 | 0 |
| I | 20 | 50 | 30 |
| J' | 20 | 40 | 40 |
| K | 10 | 40 | 50 |
| L | 10 | 20 | 70 |
| M | 5 | 20 | 75 |
| E | 65 | 15 | 20 |
| H' | 30 | 50 | 20 |

The relations between the activity of the catalyst and the manganese oxide content of the catalyst are shown in Table 4. The percent purification of carbon monoxide in Table 4 was calculated in the same manner as in Table 2.

Table 4

| Catalyst composition (% by weight) | | | Percent purification of CO (%) | |
|---|---|---|---|---|
| Calcium aluminate | $MnO_2$ | Aggregates | 300°C | 800°C |
| 20 | 80 | 0 | 98.0 or higher | 98.0 or higher |
| 20 | 70 | 10 | 98.0 or higher | 98.0 or higher |
| 20 | 50 | 30 | 92.7 | 98.0 or higher |
| 20 | 20 | 60 | 73.1 | 94.1 |
| 20 | 0 | 80 | 18.3 | 46.9 |

The foregoing results reveal that at a low temperature such as 300°C, the catalyst having a manganese dioxide content of less than 20 percent by weight has a very poor percent purification, for example, less than 20 percent, whereas the catalyst having a manganese dioxide content of 20 percent by weight has a percent purification of more than 70 percent. Further, at a high temperature of 800°C, the catalyst having even a manganese dioxide content of less than 20 percent by weight has an improved percent purification, but the percent purification of less than 50 percent is not satisfactory. The catalyst having a manganese dioxide content of more than 20 percent by weight has a percent purification of more than 90 percent, and thus has a good catalytic performance. The manganese dioxide content greatly contributes to the percent purifiction, and the percent purification is not changed almost at all even by changing the contents of calcium aluminate and aggregates, while keeping the manganese dioxide content constant.

It is seen from the foregoing that the catalysts that satisfy the spalling resistance and catalytic activity at a high temperature are within a composition range surrounded by lines plotted between the points D, E, H', I, J', K, L and M of FIG. 4.

In the foregoing examples, conical siliceous sands of silica aggregates were used as the heat-resistant aggregates, but similar results could be obtained with the aforementioned alumina and silica-alumina aggregates.

Calcium aluminate containing about 79.0 percent by weight of alumina and about 18.7 percent by weight of calcium oxide, the balance being $Fe_2O_3$ and $TiO_2$, was used as the binder, but the similar results could be obtained with calcium aluminate having not more than about 40 percent by weight of calcium oxide.

In the foregoing example, $MnO_2$ was used as the manganese oxide as a main catalytic component, but as to the spalling resistance at a high temperature, almost similar results of cracking strength as in the case of $MnO_2$ were obtained with the catalysts prepared from $MnO_x$ ($x = 1.5 - 1.33$), for example, $Mn_2O_3$, $Mn_3O_4$, etc. This means that, when such manganese oxides as $Mn_2O_3$ and $Mn_3O_4$ are used as a raw material for the main catalytic component, the similar results as in the case of $MnO_2$ used as the raw material can be obtained so long as the manganese oxide content is witin said stoichiometrical composition range in terms of $MnO_2$, though the manganese content differs at the normal temperature.

In addition to the main catalytic component of the manganese oxide, not more than 20 percent by weight of at least one kind of promoters can be added to the catalyst to improve the low temperature activity As the promoter, $NiO_2$, $Fe_2O_3$, $Cu_2O$, $CuO$, $V_2O_5$, $Co_2O_3$, $Co_3O_4$, $PbO$, $TiO_2$, $Ag_2O$, $R_EO_X$ (rare earth oxides) etc. are used, depending upon the purpose and use of the catalyst.

In the foregoing Examples, no mention is made of hydrocarbon, but the percent purification of hydrocarbon generally shows a tendency almot identical with that of carbon monoxide.

As described above, the present catalyst for purifying the exhaust gas is advantageously prepared by adding to a mixture of manganese oxide, calcium aluminate and aggregates a sufficient amount of water to mold the mixture, mixing the mixture by wet process, molding the mixture, subjecting the moldings to the primary curing, then adding a sufficient amount of water to the moldings and subjecting the moldings to complete curing and solidification. According to this procedure, the catalysts having any desired shape can be readily obtained. Therefore, the present catalysts can be prepared in any desired shape such as granular shape, honeycomb structure, etc. in mass production scale according to this procedure, depending upon the service purpose and use of the catalyst.

Further, the present catalysts can be prepared by the molding and curing, and thus their preparation are easy and the catalysts of desired constant quality or composition can be obtained. The catalysts thus prepared always have a constant gas purification ability, even if the surfaces of the catalysts are abraded, because the parts to be successively exposed by the abrasion are constant in quality of composition. Further, the present catalysts also have a good spalling resistance, as described above.

The present catalysts can be used for purification of carbon monoxide and hydrocarbons contained in the exhaust gas from engines of automobiles, petroleum

What is claimed is:

1. A catalyst for purification of exhaust gas, which consists essentially of manganese oxide as a main catalytic component, heat-resistant aggregates and calcium aluminate as a binder, proportions of the manganese oxide in terms of manganese dioxide, the aggregates and the calcium aluminate being within a composition range surrounded by lines plotted between points D, E, H, I and J of ternary catalyst composition diagram of FIG. 1.

2. A catalyst according to claim 1, where the calcium aluminate contains 50 to 80 percent by weight of alumina and 40 to 15 percent by weight of calcium oxide.

3. A catalyst according to claim 1, wherein the aggregates are selected from the group consisting of silica aggregates, alumina-silica aggregates, alumina aggregates, and mixtures thereof.

4. A catalyst according to claim 1, wherein the proportions of the manganese oxide in terms of manganese dioxide, the aggregates and the calcium aluminate are within a composition range surrounded by lines plotted between points D, E, H', I, J', K, L, and M of ternary catalyst composition diagram of FIG. 4.

5. A catalyst according to claim 4, wherein the calcium aluminate contains 50 to 80 percent by weight of alumina and 40 to 15 percent by weight of calcium oxide.

6. A catalyst according to claim 4, wherein the aggregates are selected from the group consisting of siliceous sands, mullite, sillimanite, agalmatolite, corundum, and mixtures thereof.

7. A process for producing a catalyst for purifying exhaust gas consisting essentially of manganese oxide as a main catalytic component, heat-resistant aggregates and calcium aluminate as a binder, which comprises adding to a mixture of manganese oxide, aggregates and calcium aluminate, a sufficient amount of water to mold the mixture, mixing the wet mixture and molding the mixed mixture to form moldings, allowing said molded articles to stand to undergo primary curing until the articles have a mechanical strength, and completely curing the moldings by adding sufficient water to solidify said moldings.

8. A process according to claim 7, wherein the manganese oxide is manganese dioxide.

UNITED STATES PATENT OFFICE
CERTIFICATE OF CORRECTION

Patent No. 3,905,917        Dated September 16, 1976

Inventor(s)   Atsushi Nishino et al.        Page 1 of 4

It is certified that error appears in the above-identified patent and that said Letters Patent are hereby corrected as shown below:

Insert FIG. 1, FIG. 2, FIG. 3 and FIG. 4, as part of Letters Patent 3,905,917 --.

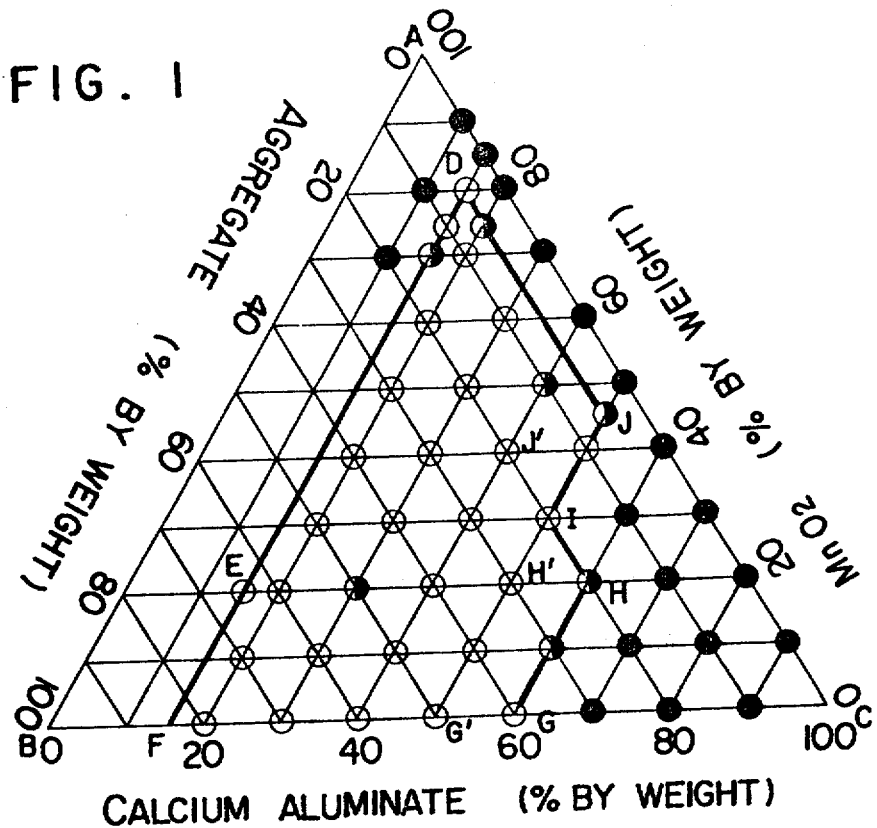

UNITED STATES PATENT OFFICE
CERTIFICATE OF CORRECTION

Patent No. 3,905,917              Dated September 16, 1976

Inventor(s) Atsushi Nishino et al.          Page 2 of 4

It is certified that error appears in the above-identified patent and that said Letters Patent are hereby corrected as shown below:

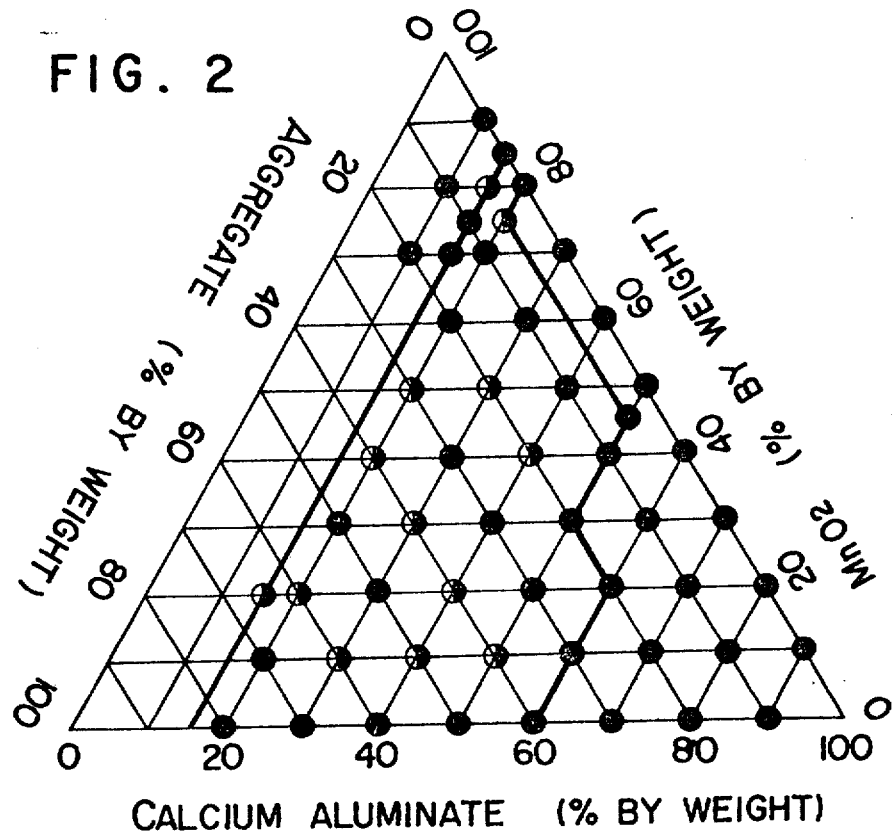

UNITED STATES PATENT OFFICE
CERTIFICATE OF CORRECTION

Patent No. 3,905,917         Dated September 16, 1976

Inventor(s) Atsushi Nishino et al.         Page 3 of 4

It is certified that error appears in the above-identified patent and that said Letters Patent are hereby corrected as shown below:

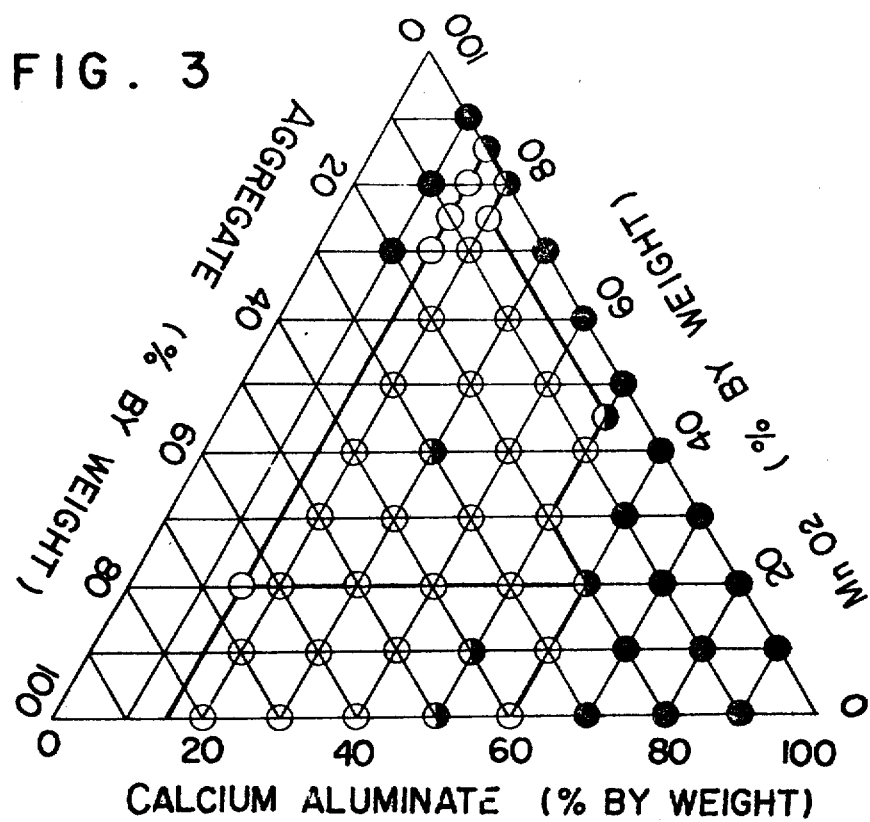

UNITED STATES PATENT OFFICE
CERTIFICATE OF CORRECTION

Patent No. 3,905,917　　　　　　Dated September 16, 1976

Inventor(s) Atsushi Nishino et al.　　　　Page 4 of 4

It is certified that error appears in the above-identified patent and that said Letters Patent are hereby corrected as shown below:

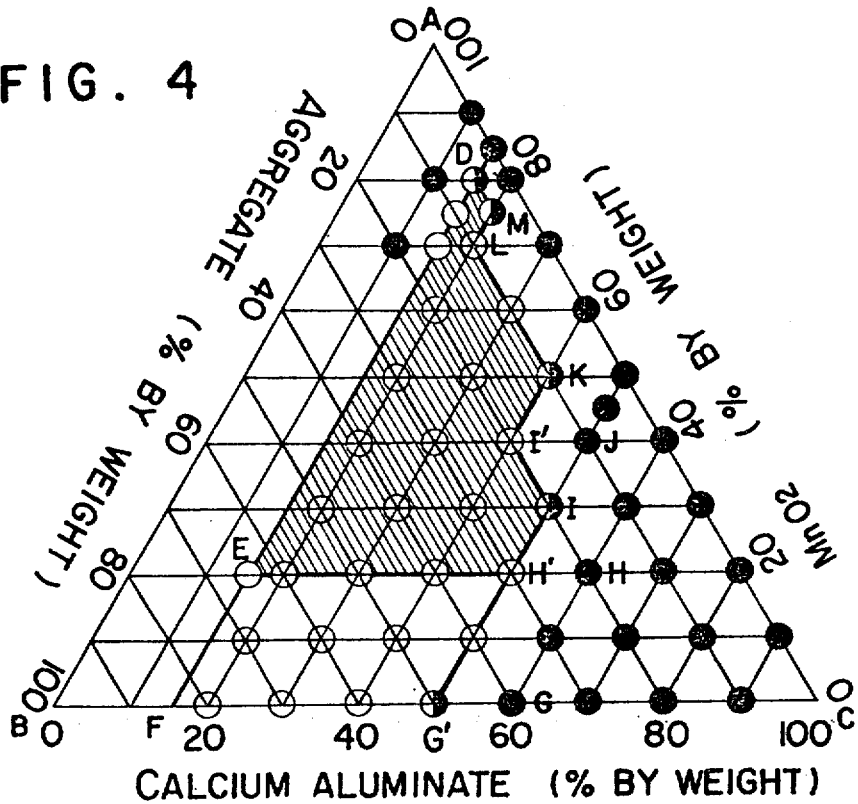

Signed and Sealed this

Third Day of May 1977

[SEAL]

Attest:

RUTH C. MASON
*Attesting Officer*

C. MARSHALL DANN
*Commissioner of Patents and Trademarks*